United States Patent
Chai et al.

(10) Patent No.: US 10,530,285 B1
(45) Date of Patent: Jan. 7, 2020

(54) METHOD AND MOTOR CONTROLLER FOR MEASURING MAGNITUDE OF VARYING NON-SINUSOIDAL VOLTAGES AND CURRENTS OF A MOTOR CONTROLLER

(71) Applicant: Hamilton Sundstrand Corporation, Charlotte, NC (US)

(72) Inventors: Harry Huazhen Chai, Caledonia, IL (US); Tyler W. Hayes, Rockford, IL (US)

(73) Assignee: Hamiton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/181,097

(22) Filed: Nov. 5, 2018

(51) Int. Cl.
*H02P 23/00* (2016.01)

(52) U.S. Cl.
CPC .............................. *H02P 23/0022* (2013.01)

(58) Field of Classification Search
CPC ...... H02P 1/04; H02P 1/26; H02P 1/42; H02P 1/46; H02P 3/00; H02P 3/18; H02P 3/24; H02P 6/001; H02P 6/002; H02P 6/12; H02P 21/00; H02P 21/0017; H02P 21/0035; H02P 21/13; H02P 21/148; H02P 23/00; H02P 23/0081; H02P 23/065; H02P 25/021; H02P 25/08; H02P 25/088; H02P 27/00; H02P 27/04; H02P 27/06; H02P 29/02
USPC ......... 318/400.01, 400.02, 400.14, 700, 701, 318/727, 800, 801; 361/1, 21, 23, 30, 56, 361/57, 90, 91.1
See application file for complete search history.

(56) References Cited

U.S. PATENT DOCUMENTS

| | | | |
|---|---|---|---|
| 5,796,235 A | 8/1998 | Schrodl et al. | |
| 8,009,450 B2 * | 8/2011 | Royak ................... | H02M 7/219 363/84 |
| 8,362,759 B2 | 1/2013 | Ha et al. | |
| 9,281,772 B2 | 3/2016 | Wang et al. | |
| 9,614,473 B1 | 4/2017 | Qian | |

* cited by examiner

*Primary Examiner* — Antony M Paul
(74) *Attorney, Agent, or Firm* — Locke Lord LLP; Scott D. Wofsy; Judy R. Naamat

(57) ABSTRACT

A method of controlling a motor controller includes receiving respective measurements for each of at least three phase currents or voltages output by the motor controller that were instantaneously sensed at substantially the same instant, determining a magnitude of a model signal that models the sensed phase currents or voltages at the instant of the instantaneous sensing as a function of each of the respective measurements, and controlling the motor controller based on the magnitude of the model signal. A motor controller and a controller of a motor controller using the method are also provided.

19 Claims, 6 Drawing Sheets

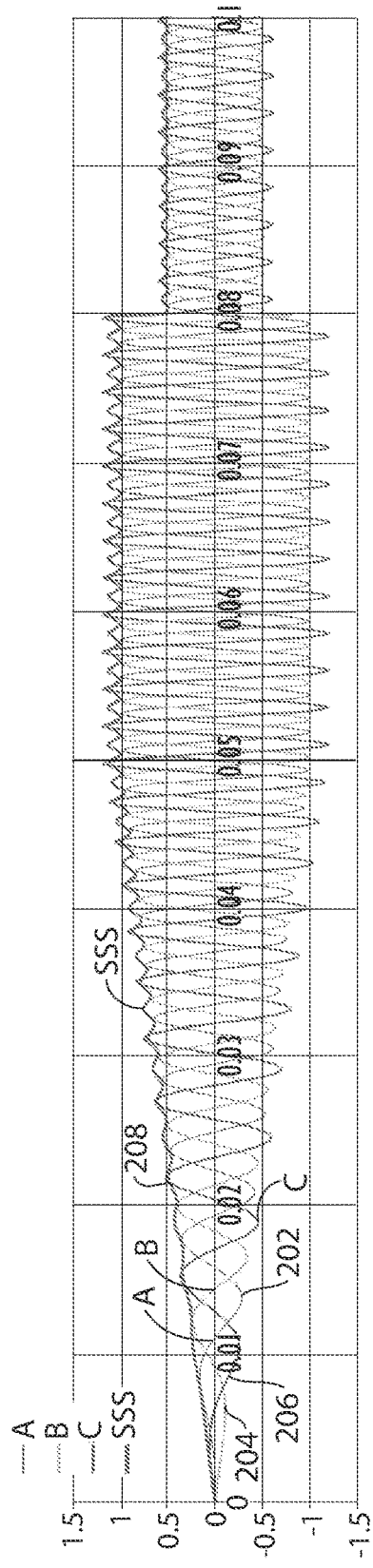
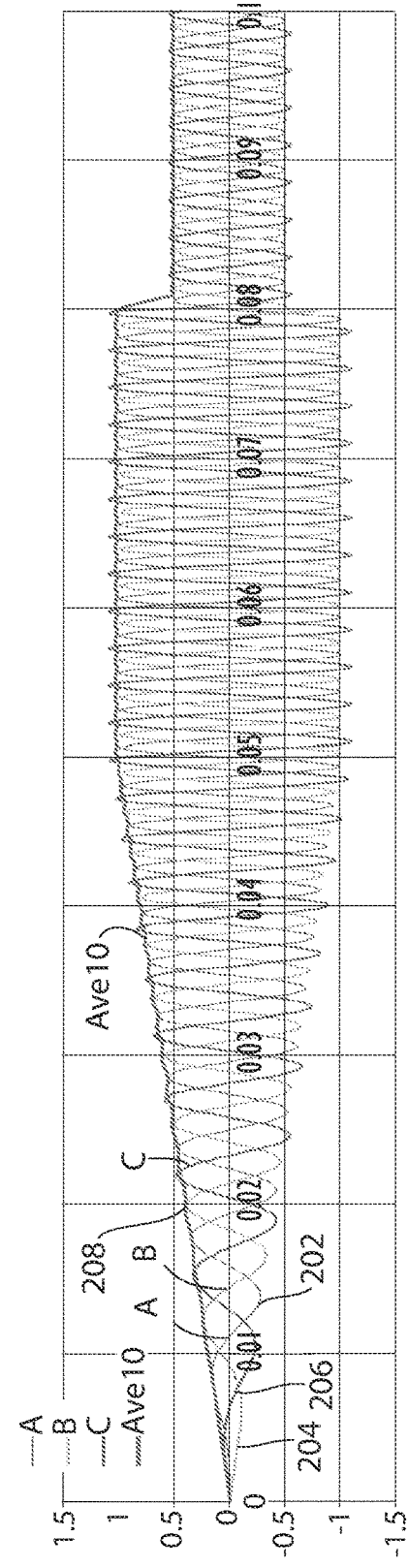
Fig. 4A
Fig. 4B

METHOD AND MOTOR CONTROLLER FOR MEASURING MAGNITUDE OF VARYING NON-SINUSOIDAL VOLTAGES AND CURRENTS OF A MOTOR CONTROLLER

BACKGROUND OF THE INVENTION

1. Field of the Invention

The present disclosure relates to motor controllers for driving a motor with multiphase power, and more particularly to measuring magnitude of varying non-sinusoidal voltages and currents of the multiphase power.

2. Description of Related Art

Multiphase power signals output by a motor controller to a motor can be affected by conditions associated with the motor, such as motor ramp-up, motor ramp-down, motor load command changes, and/or motor torque command changes. These conditions can cause the multiphase power signals to be non-sinusoidal signals. Challenges can arise for measuring the non-sinusoidal signals accurately and without lag. The term "sinusoidal" refers to a smooth wave having a fixed magnitude and values vary instantaneously with time, cyclically. For two or more periods, the cycle is repeated exactly between any two points a period apart. The term "non-sinusoidal" refers to any arbitrary shaped signal that is not strictly sinusoidal.

There is a need to measure the magnitude of voltage and current output by the motor controller as quickly and accurately as possible for purposes of protection of the motor controller and/or motor and/or for controlling current and/or voltage, such as by a current control loop. Fast protection is critical for aerospace applications using motor controllers because the electrical and electronic components within a motor controller and motor are configured not only for use with continuous power, but also for use under fault current or voltage conditions. Fast detection and protection of fault current or voltage conditions make it possible to minimize the size and weight of the motor.

While conventional methods and systems have generally been considered satisfactory for their intended purpose, there is still a need in the art for methods, motor controllers, and controllers of motor controllers that provide fast protection of a motor and/or a motor controller, especially when the motor operates at low speed or during a transient, including improving the speed and accuracy of measuring the magnitude of multiphase power signals output by a motor controller. The present disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of controlling a motor controller. The method includes receiving respective measurements for each of at least three phase currents or voltages output by the motor controller that were instantaneously sensed at substantially the same instant, determining a magnitude of a model signal that models the sensed phase currents or voltages at the instant of the instantaneous sensing as a function of each of the respective measurements, and controlling the motor controller based on the magnitude of the model signal.

In embodiments, controlling the motor controller can include controlling at least one of an AC/DC conversion stage of the motor controller that converts variable frequency signals into a DC voltage and a DC/AC conversion stage that converts the DC voltage into an AC current having the at least three phase currents or voltages output by the motor controller.

In embodiments, determining the magnitude can be performed during the same cycle defined by zero-crossings of at least one of the at least three phase currents or voltages during which the instantaneous sensing was performed.

In embodiments, controlling the motor controller can be performed during the same cycle.

In embodiments, the method can further include detecting an imbalanced condition, wherein the imbalanced condition is characterized by a threshold difference in peak magnitude or frequency between at least two of the at least three phase currents or voltages.

In embodiments, when an imbalanced condition is detected, the method can further include applying an averaging function to the received respective measurements that occurred in two or more cycles defined by zero-crossings of at least one of the at least three phase currents or voltages during which the instantaneous sensing was performed. Determining the magnitude of the model signal can be determined as a function of a result of the averaging function. In embodiments, the at least two or more cycles can be consecutive cycles.

In accordance with an aspect of the disclosure, a controller is provided for controlling a motor controller. The controller includes a memory configured to store instructions and a processor disposed in communication with the memory. The processor, upon execution of the instructions is configured to perform the method of the disclosure.

In accordance with aspects of the disclosure, a motor controller is provided. The motor controller includes an AC/DC conversion stage configured to receive variable frequency signals and converts the variable frequency signals to a DC voltage, a DC/AC conversion stage configured to convert the DC voltage into an AC current output having a constant frequency, sensors configured to instantaneously sense at substantially the same instant at least three phase currents or voltages output by the motor controller and outputs corresponding measurements, a controller. The controller is configured to receive respective measurements for each of at least three phase currents or voltages output by the motor controller that were instantaneously sensed at substantially the same instant and determine a magnitude of a model signal that models the sensed phase currents or voltages at the instant of the instantaneous sensing as a function of each of the respective measurements.

In embodiments, the controller can be further configured to control at least one of the AC/DC conversion stage and the DC/AC conversion stage based on the magnitude of the model signal.

In embodiments, determining the magnitude can be performed during the same cycle defined by zero-crossings of at least one of the at least three phase currents or voltages during which the instantaneous sensing was performed.

In embodiments, controlling the motor controller can be performed during the same cycle.

In embodiments, the controller can be further configured to detect an imbalanced condition, wherein the imbalanced condition is characterized by a threshold difference in peak magnitude or frequency between at least two of the at least three phase currents or voltages.

In embodiments, when an imbalanced condition is detected, the controller can be further configured to apply an averaging function to the received respective measurements that occurred in two or more cycles defined by zero-crossings of at least one of the at least three phase currents or voltages during which the instantaneous sensing was performed. Determining the magnitude of the model signal can be determined as a function of a result of the averaging function.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4A is a graph showing example plots of measured phase signals having an imbalanced condition that are output by a motor controller of the motor controlling system and a model signal that is determined by a controller of the motor controlling system;

FIG. 4B is a graph showing example plots of measured phase signals having an imbalanced condition that are output by a motor controller of the motor controlling system and a model signal with an averaging function applied that is determined by a controller of the motor controlling system.

DETAILED DESCRIPTION OF THE PREFERRED EMBODIMENTS

Figure 1A:
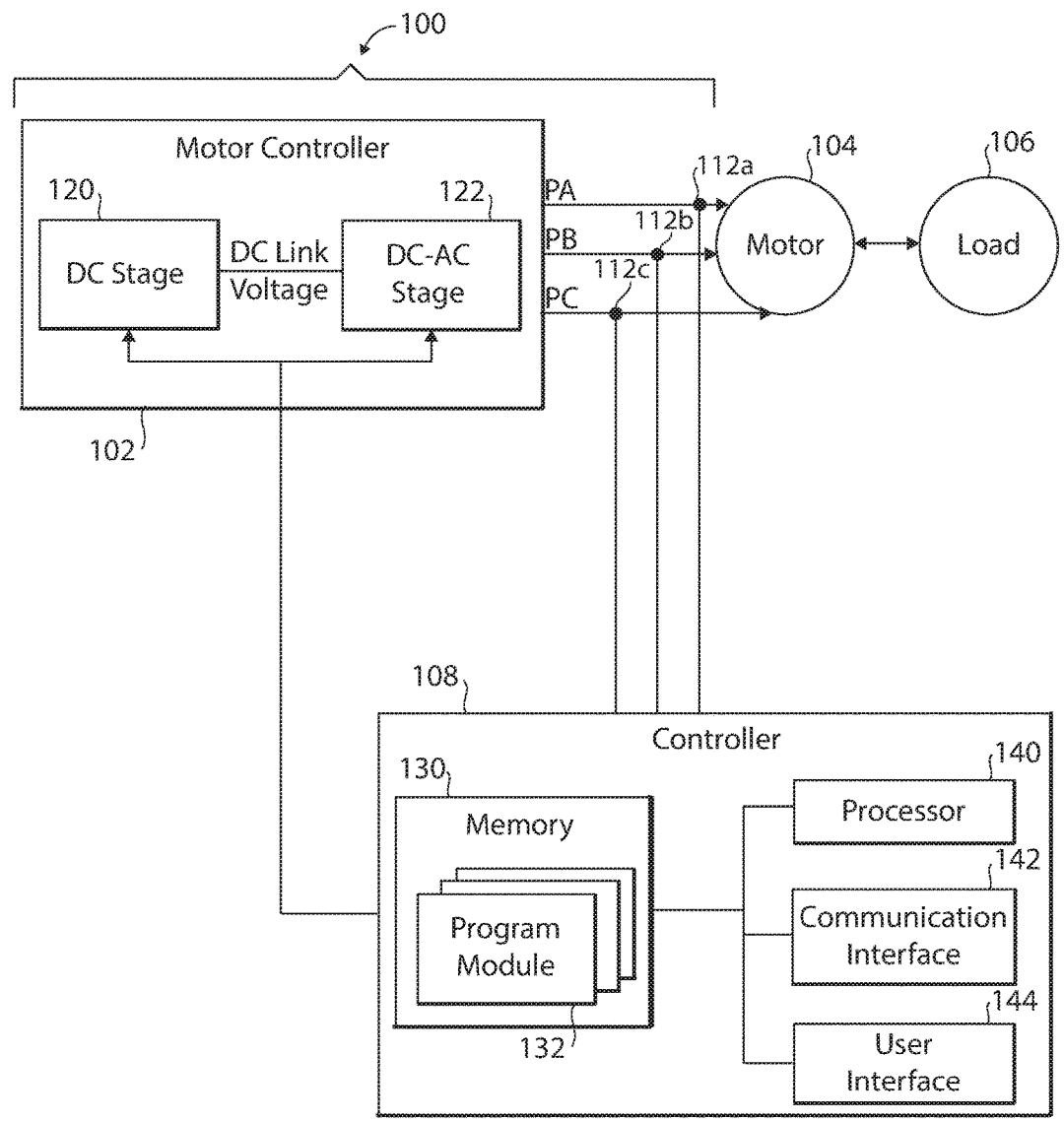
FIG. 1A is a schematic view of an exemplary embodiment of a motor controlling system in accordance with an embodiment of the disclosure.

Reference will now be made to the drawings wherein like reference numerals identify similar structural features or aspects of the subject disclosure. For purposes of explanation and illustration, and not limitation, a partial view of an exemplary embodiment of an optical system mount arrangement in accordance with the disclosure is shown in FIG. 1 and is designated generally by reference character 100. Embodiments of a method, motor controller, and controller for a motor controller, for obtaining measurements of magnitude of varying non-sinusoidal voltages and currents output by a motor controller in accordance with the disclosure, or aspects thereof, are provided in FIGS. 2-5, as will be described. The systems and methods described herein can be used for providing control to a motor controller, such as a field oriented controlled motor controller or a motor controller used in conjunction with an aircraft engine, though the present disclosure is not limited to any specific type of motor controller or application of a controller.

Referring to FIG. 1, a motor controller system 100 is provided. The motor controller system 100 provides multi-phase power signals to a motor 104. The motor 104 is operatively coupled to a load 106 that can be driven by the motor 104. The motor 104 can be, for example, an induction motor, permanent magnet motor, or synchronous motor. The motor 104 can function as a mechanical power source that drives load 106, wherein the load 106 can be a machine that uses mechanical power.

The motor controller system 100 can include a DC stage 120 and a DC-AC stage 122. The DC stage 120 can receive a DC voltage from a DC voltage source (not shown), include a DC voltage source (not shown) that provides a DC voltage, or receive AC power signals from an AC energy source (not shown), such as an engine driven generator. The AC energy source can be a variable frequency generator driven by a variable frequency energy source, for example, an aircraft engine, without limitation to a particular AC energy source. The DC stage 120 can convert the AC signals (which can include signals of variable frequency) into a DC voltage, such as using a rectifier (not shown).

The DC voltage can be provided from the DC stage 120 to the DC-AC stage 122 as a DC link voltage, e.g., via links across a capacitor (not shown). The DC-AC stage 122 can receive the DC link voltage and convert it into a multiphase power signal, shown as Pa, Pb, Pc, that is provided to the motor 104, e.g., to respective stators (not shown) of the motor 104, for driving the motor 104. The DC-AC stage 122 can include, for example, an inverter (not shown) that converts DC power provided by the DC voltage link into the multiple phase AC power signal Pa, Pb, Pc.

The multiphase power signals Pa, Pb, Pc, can be affected by conditions associated with the motor 104, such as during ramp-up or ramp-down of the motor 104 or when there are changes to the motor load and/or motor torque. These conditions can cause the multiphase power signals Pa, Pb, Pc, to be non-sinusoidal signals. Challenges can arise for measuring the non-sinusoidal signals accurately and without lag.

Current or voltage sensors 112a, 112b, and 112c are provided at the respective phases of an output side of the DC-AC stage 122 to sense phase currents or voltages of the phase signals Pa, Pb, Pc and output measurements. A measurement of Pa, Pb, Pc can be obtained instantaneously at the same instant for each of the current or voltage sensors 112a, 112b, 112c. The measurements are provided to the controller 108. The controller 108 can determine a magnitude of a model signal that models the sensed phase currents or voltages at a particular instant at which measurements were obtained instantaneously by the current or voltage sensors 112a, 112b, 112c. The magnitude of the model signal can be determined as a function of each of the respective measurements by the current or voltage sensors 112a, 112b, 112c. An example function, without limiting the disclosure to the particular function, that is applied to each of the measurements by the current or voltage sensors 112a, 112b, 112c as measured at a particular instant, is shown as Equation 1:

$$Pa^2 + Pb^2 + Pc^2 \quad (1)$$

The controller 108 can also control the motor controller 102 based on the magnitude of the model signal. Controlling the motor controller 102 can include protecting the motor controller 102, e.g., from an over current or over voltage condition. Controlling the motor controller 102 can include controlling at least one of the DC stage 120 or the DC-AC stage 122. Controlling either of the DC stage 120 or the DC-AC stage 122 can include controlling switches included in the DC stage 120 that affect one or more characteristics of the DC link voltage or switches included in the DC-AC stage 122 that affect one or more characteristics of the multiphase power signals output. Accordingly, controlling either of the DC stage 120 or the DC-AC stage 122 can provide protection (e.g., based on an over current and/or over voltage condition) to the motor controller 102 and/or motor 104, as well as control how the motor controller 102 and/or motor 104 operates (e.g., to provide current control). Since the current or voltage sensors 112a, 112b, 112c obtain measurements at substantially the same instant, the measurements are obtained during the same cycle defined by zero-crossings of at least one of the at least three phase currents or voltages. In embodiments, the magnitude of the model signal can also be performed during that cycle. Furthermore, in embodiments, the magnitude can be used to control the motor controller 102 during the cycle.

Controller 108 includes a processor 140, a communications interface 142, an optional user interface 144, and a memory 130. The communications interface 142 can communicate with an external processor. Additionally or alternatively, the communications interface 142 can output control signals to the motor controller, in particular the DC stage 120 and/or AC-DC stage 122. Memory 130 includes a non-transitory machine readable medium having a plurality of program modules 132 recorded on it that, when read by processor 140, cause controller 108 to execute certain actions. Among those actions are operations of a method 200 (shown in FIG. 5) of controlling the motor controller, as will be described. It is contemplated that controller 108 can be implemented with software, circuitry, or a combination of circuitry and software, as suitable for an intended purpose.

The technique used by the controller 108 thus includes measuring the phase currents or voltages based on a physical model of the motor 104, and estimating the phase voltages and/or currents based on the energy and power flow to the motor 104. When the multiple phases are balanced, meaning their peak magnitudes are substantially equal or within a threshold range of one another, instantaneous measurements for the multiple phases by the current or voltage sensors 112a, 112b, 112c at a single moment can be used to obtain the magnitude of a model signal. The measurement bandwidth can be virtually unlimited theoretically, being limited practically by a sampling rate of the current or voltage sensors 112a, 112b, 112c.

Figure 1B:
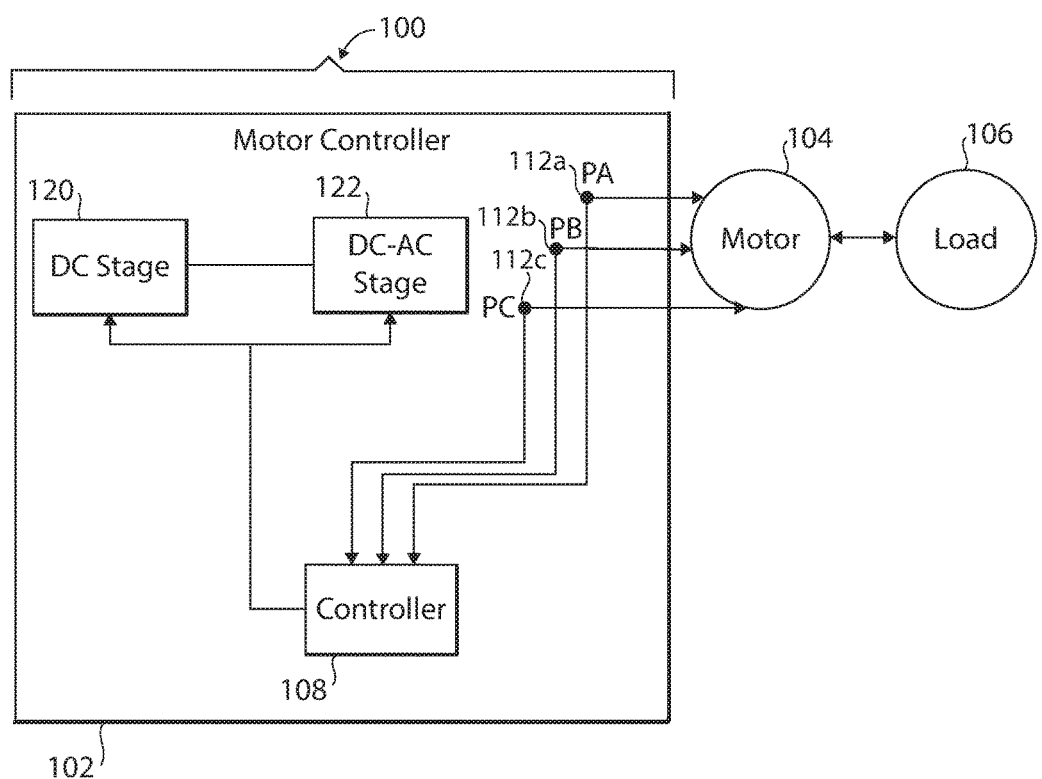
FIG. 1B is a schematic view of an exemplary embodiment of a motor controlling system in accordance with another embodiment of the disclosure.

FIG. 1B shows another embodiment of FIG. 1A, the difference being that the controller 108 and the current or voltage sensors 112a, 112b, 112c are included within the motor controller 102. In other embodiments the controller 108 or the current or voltage sensors 112a, 112b, 112c are included within the motor controller 102.

Figure 2:
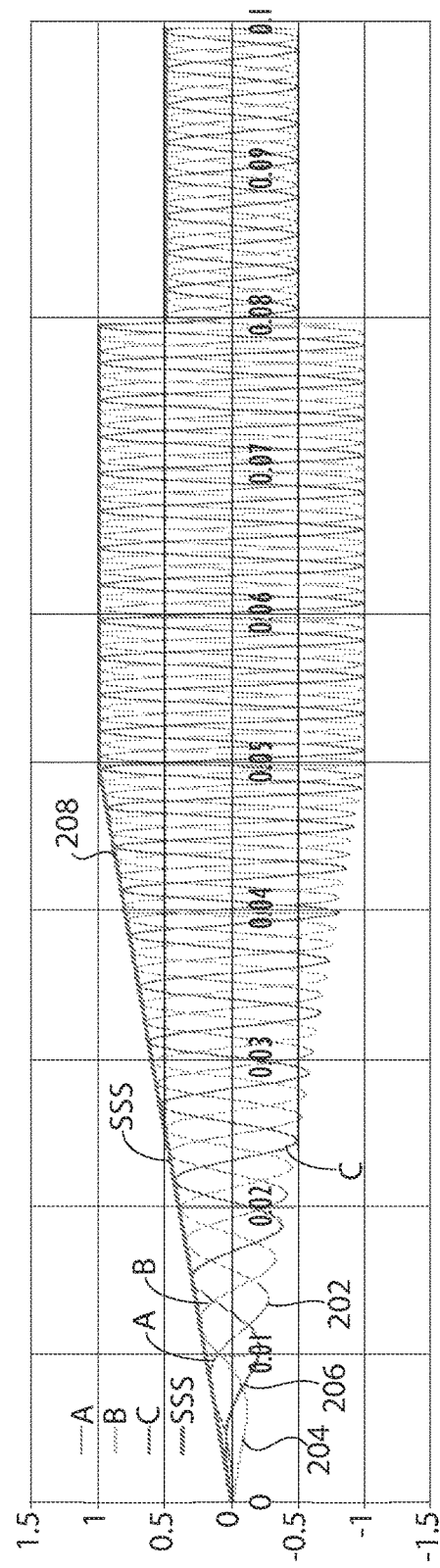
FIG. 2 is graph showing example plots for measured phase signals having a balanced condition that are output by a motor controller of the motor controlling system and a model signal that is determined by a controller of the motor controlling system.

FIG. 2 illustrates three example phase signals 202, 204, 206 that are the current or voltage phase signals of power signal Pa, Pb, Pc and the magnitude of the model signal 208 determined by applying Equation (1). The phase signals 202, 204, 206 exhibit ideal balanced conditions, meaning the peak magnitudes of the signals are substantially equal or change at substantially the same rate. The model signal 208 tracks the magnitude of the phase signals 202, 204, 206 almost instantaneously over time, even during a ramp change (shown as a ramp-up) and a step change (shown as a step-down), wherein the phase signals 202, 204, 206 have a sinusoidal shape of varying frequency. When such ideal balanced conditions exist, the model signal 208 remains a straight line without ripples and follows the magnitude of the three phase quantities with minimal or no lag.

Figure 3A:
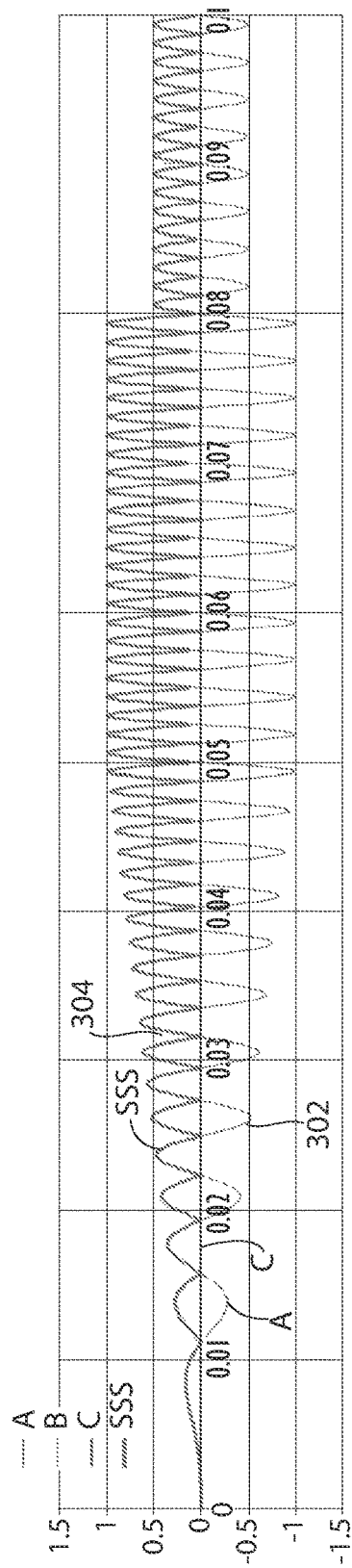
FIG. 3A is a graph showing example plots of root mean square (RMS) estimation of power output by the motor controller.
Figure 3B:
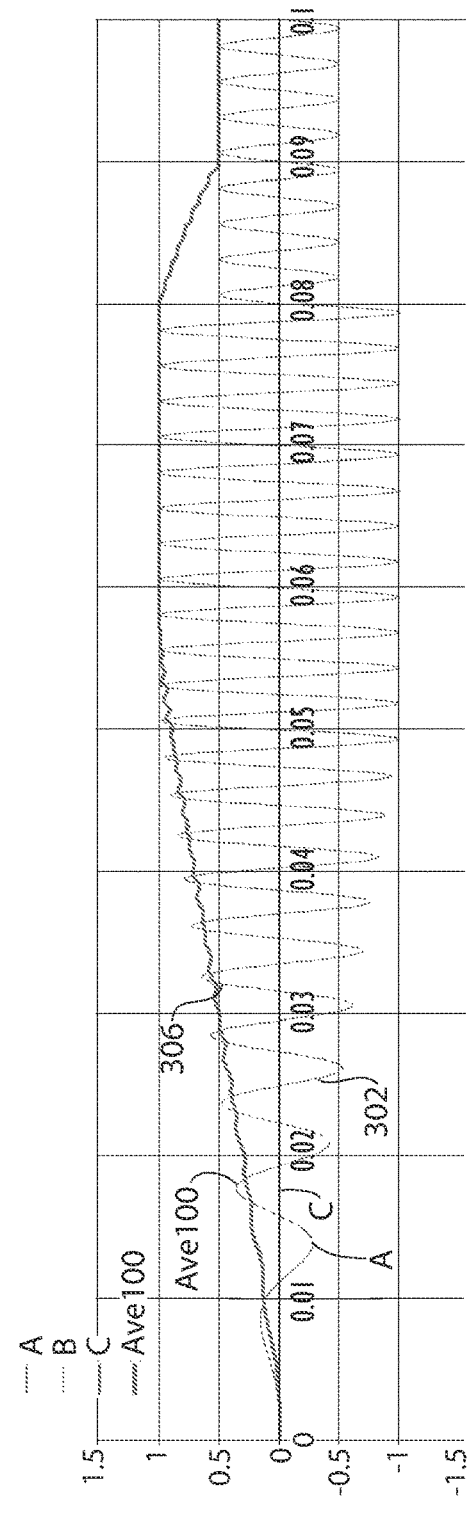
FIG. 3B is a graph showing example plots of averaged RMS estimation of power output by the motor controller.

FIGS. 3A and 3B show methods that rely on root-mean-square calculations, but do not use functions that apply instantaneous measurements for each of the multiple phases sensed by the current or voltage sensors 112a, 112b, 112c. FIG. 3A applies a root mean square (RMS) method to a signal 302 that results in a processed signal 304 that exhibits significant rippling. FIG. 3B applies an RMS method to signal 302 by determining an RMS value of signal 302 and evaluating the RMS value over one cycle or multiple cycles, wherein signal 302 has a sinusoidal shape of varying frequency. Signal 306 is an estimated value of signal 302 that uses a rectangular moving average window of 10 ms. Signal 306 responds slowly to the shape of signal 302, taking more than several cycles (which can be defined by zero crossing) to settle to the peak correct magnitude of signal 302 when the peak magnitude of signal 302 changes by a ramp or step change. The lag is pronounced when signal 302 has a low frequency due to increased time between cycles. If the RMS value is calculated in a cycle or multiple cycles, as commonly based on zero crossing detections, the RMS value jitters when a new zero crossing is detected. When applying the moving average window (e.g., using rectangular or Hanning window methods) having a fixed length, there is a tradeoff between dynamic speed and accuracy.

A peak detection method can include using detected sinusoidal peaks to determine an RMS value of its varying sinusoidal quantities. However, this method, when instantaneous measurements for each of the multiple phases sensed by the current or voltage sensors 112a, 112b, 112c are not used, is slow (particularly at low frequencies) and highly sensitive to noise and glitches in voltages, currents, or measurement circuits.

However, speed and accuracy are both important features when controlling the motor controller 102 using estimation of the multiphase signals output by the motor controller 102. Low speed detrimentally affects the ability to control the output of the motor controller 102 to the motor 104, and reduces protection from over current or over voltage conditions.

FIGS. 4A and 4B show an imbalance condition of the three phase signals 202, 204, 206 shown in FIG. 2. In the example shown, the imbalance condition is manifested by peaks of phase signal 206 are 20% being higher than peaks of phase signals 204 and 206 over time. FIG. 4A does not use any averaging, wherein FIG. 4B uses rectangular shaped moving average sample windows.

Under such imbalanced conditions, the model signal 208 shown in FIGS. 4A and 4B has a small amount of ripples. The ripples of model signal 208 of FIG. 4A are considerably smaller than ripples that occur when using the RMS and/or peak detection methods without using instantaneous measurements for each of the multiple phases sensed by the current or voltage sensors 112a, 112b, 112c, such as those shown in FIG. 3A. The model signal 208 shown in FIG. 4A still tracks the peak magnitude of the phase signals 202, 204, 206 almost instantaneously, including during ramp-up and step-down changes of phase signals 202, 204, 206. The model signal 208 shown in FIG. 4B tracks has reduced rippling and a very slight lag during ramp-up or step-down changes. The lag shown in FIG. 4B is considerably smaller than the lag shown in FIG. 3B.

Figure 5:
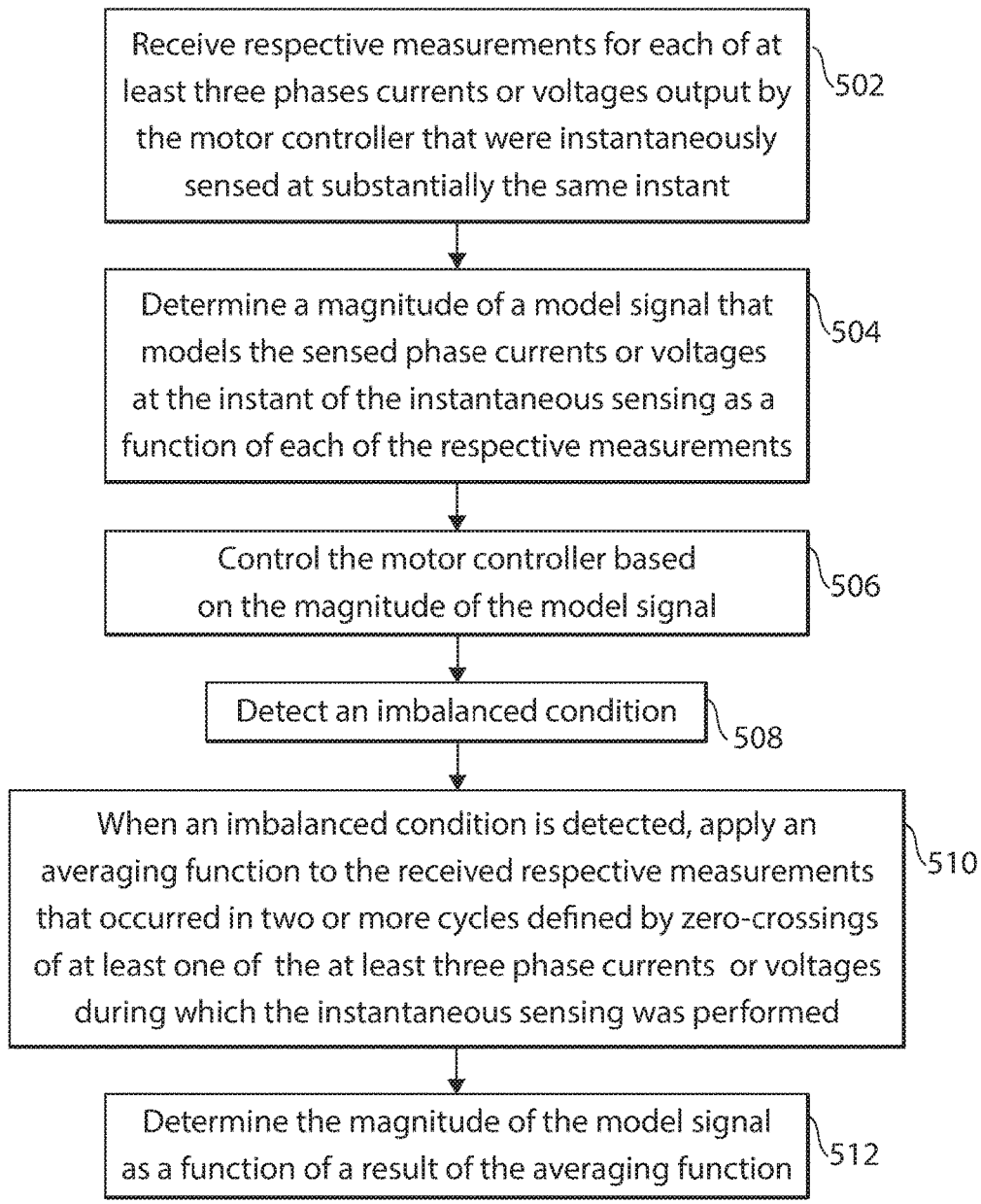
FIG. 5 is a flowchart of a method of controlling the motor controller in accordance with an aspect of the disclosure.

With reference now to FIG. 5, shown is a flowchart demonstrating implementation of the various exemplary embodiments. It is noted that the order of operations shown in FIG. 5 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 5 shows a flowchart 500 that illustrates an example method performed by a controller of a motor controller, such as controller 108 shown in FIG. 1. At operation 502, respective measurements are received for each of at least three phase currents or voltages output by the motor controller that were instantaneously sensed at substantially the same instant. At operation 504, a magnitude of a model signal is determined, wherein the model signal models the sensed phase currents or voltages at the instant of the instantaneous sensing as a function of each of the respective measurements.

At optional operation 506, the motor controller is controlled based on the magnitude of the model signal. At optional operation 508, an imbalanced condition, is detected. As used here, detection of an imbalanced condition can include anticipating an imbalanced condition, such as detecting a trend of an increase or reduction in any of the at least three phase currents or voltages. The imbalanced condition can be characterized by a threshold difference in peak magnitude or frequency in general, or magnitude or frequency between at least two of the at least three phase currents or voltages. At optional operation 510, when an imbalanced condition is detected, an averaging function is applied to the received respective measurements that occurred in two or more cycles defined by zero-crossings of at least one of the at least three phase currents or voltages during which the instantaneous sensing was performed. At operation 512, the magnitude of the model signal is determined as a function of a result of the averaging function, which can then be used to control the motor controller.

The methods and systems of the present disclosure, as described above and shown in the drawings, provide for controlling a motor controller with superior properties including the ability to minimize or eliminate time lag for determining magnitude of a model signal that models current or voltage phase signals output by the motor controller. The magnitude of the model signal is based on instantaneous measurements for each of the multiple phase signals output by the motor controller and sensed by the current or voltage sensors. The determination of this magnitude can be substantially or nearly instantaneous. Control of the motor controller based on this magnitude can be nearly instantaneous. This can result in nearly instantaneous over current and over voltage protection and faster current control loop for controlling a motor than is possible without using instantaneous measurements for each of the multiple phases sensed by the current or voltage sensors. While the apparatus and methods of the subject disclosure have been shown and described with reference to preferred embodiments, those skilled in the art will readily appreciate that changes and/or modifications may be made thereto without departing from the scope of the subject disclosure.

What is claimed:

1. A method of controlling a motor controller, the method comprising:
receiving respective measurements for each of at least three phase currents or voltages output by the motor controller that were instantaneously sensed at substantially the same instant;
determining a magnitude of a model signal that models the sensed phase currents or voltages at the instant of the instantaneous sensing as a function of each of the respective measurements; and
controlling the motor controller based on the magnitude of the model signal.

2. The method of claim 1, wherein controlling the motor controller includes controlling at least one of an AC/DC conversion stage of the motor controller that converts variable frequency signals into a DC voltage and a DC/AC conversion stage that converts the DC voltage into an AC current having the at least three phase currents or voltages output by the motor controller.

3. The method of claim 1, wherein determining the magnitude is performed during the same cycle defined by zero-crossings of at least one of the at least three phase currents or voltages during which the instantaneous sensing was performed.

4. The method of claim 3, wherein controlling the motor controller is performed during the same cycle.

5. The method of claim 1, further comprising detecting an imbalanced condition, wherein the imbalanced condition is characterized by a threshold difference in peak magnitude or frequency between at least two of the at least three phase currents or voltages.

6. The method of claim 5, further comprising, when an imbalanced condition is detected, applying an averaging function to the received respective measurements that occurred in two or more cycles defined by zero-crossings of at least one of the at least three phase currents or voltages during which the instantaneous sensing was performed, wherein determining the magnitude of the model signal is determined as a function of a result of the averaging function.

7. The method of claim 6, wherein the at least two or more cycles are consecutive cycles.

8. A controller for controlling a motor controller, the controller comprising:
a memory configured to store instructions;
a processor disposed in communication with the memory, wherein the processor, upon execution of the instructions is configured to:
receive respective measurements for each of at least three phase currents or voltages output by the motor controller that were instantaneously sensed at substantially the same instant;
determine a magnitude of a model signal that models the sensed phase currents or voltages at the instant of the instantaneous sensing as a function of each of the respective measurements; and
control the motor controller based on the magnitude of the model signal.

9. The controller of claim 8, wherein controlling the motor controller includes controlling at least one of an AC/DC conversion stage of the motor controller that converts variable frequency signals into a DC voltage and a DC/AC conversion stage that converts the DC voltage into an AC current having the at least three phase currents or voltages output by the motor controller.

10. The controller of claim 8, wherein determining the magnitude is performed during the same cycle defined by zero-crossings of at least one of the at least three phase currents or voltages during which the instantaneous sensing was performed.

11. The controller of claim 10, wherein controlling the motor controller is performed during the same cycle.

12. The controller of claim 8, wherein the processor, upon execution of the instructions is configured to detect an imbalanced condition, wherein the imbalanced condition is characterized by a threshold difference in peak magnitude or frequency between at least two of the at least three phase currents or voltages.

13. The controller of claim 12, wherein, when an imbalanced condition is detected, the processor, upon execution of the instructions is configured to apply an averaging function to the received respective measurements that occurred in two or more cycles defined by zero-crossings of at least one of the at least three phase currents or voltages during which the instantaneous sensing was performed, wherein determining the magnitude of the model signal is determined as a function of a result of the averaging function.

14. A motor controller comprising:
   an AC/DC conversion stage configured to receive variable frequency signals and converts the variable frequency signals to a DC voltage;
   a DC/AC conversion stage configured to convert the DC voltage into an AC current output having a constant frequency;
   sensors configured to instantaneously sense at substantially the same instant at least three phase currents or voltages output by the motor controller and outputs corresponding measurements; and
   a controller configured to:
      receive respective measurements for each of at least three phase currents or voltages output by the motor controller that were instantaneously sensed at substantially the same instant; and
      determine a magnitude of a model signal that models the sensed phase currents or voltages at the instant of the instantaneous sensing as a function of each of the respective measurements.

15. The motor controller of claim 14, wherein the controller is further configured to control at least one of the AC/DC conversion stage and the DC/AC conversion stage based on the magnitude of the model signal.

16. The motor controller of claim 15, wherein determining the magnitude is performed during the same cycle defined by zero-crossings of at least one of the at least three phase currents or voltages during which the instantaneous sensing was performed.

17. The motor controller of claim 16, wherein controlling the motor controller is performed during the same cycle.

18. The motor controller of claim 14, wherein the controller is further configured to detect an imbalanced condition, wherein the imbalanced condition is characterized by a threshold difference in peak magnitude or frequency between at least two of the at least three phase currents or voltages.

19. The motor controller of claim 18, wherein, when an imbalanced condition is detected, the controller is further configured to apply an averaging function to the received respective measurements that occurred in two or more cycles defined by zero-crossings of at least one of the at least three phase currents or voltages during which the instantaneous sensing was performed, wherein determining the magnitude of the model signal is determined as a function of a result of the averaging function.

* * * * *